UNITED STATES PATENT OFFICE.

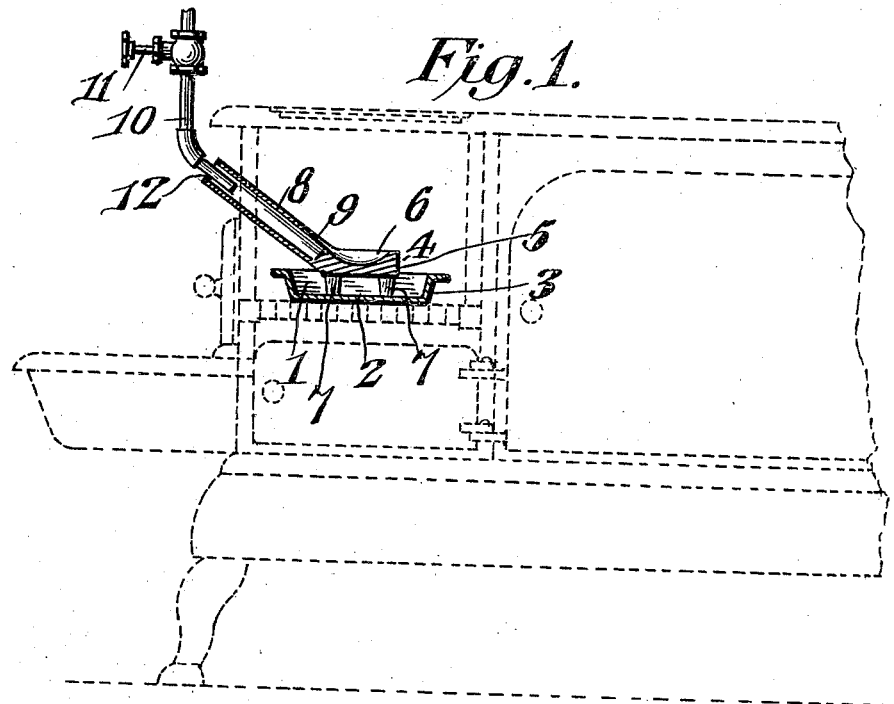
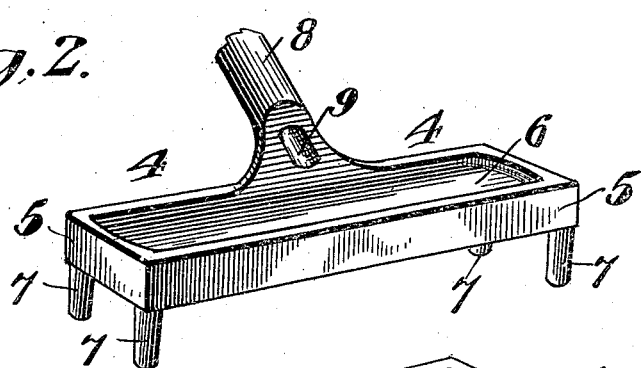
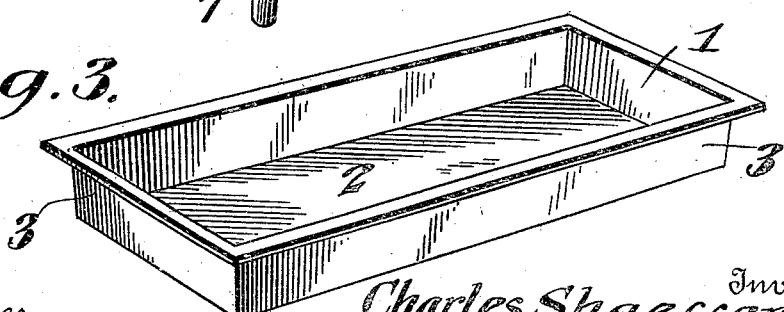

CHARLES SHAEFFER, OF PARIS, TEXAS.

CRUDE-OIL BURNER.

961,030.  Specification of Letters Patent.  Patented June 7, 1910.

Application filed March 22, 1910. Serial No. 550,996.

*To all whom it may concern:*

Be it known that I, CHARLES SHAEFFER, a citizen of the United States, residing at Paris, in the county of Lamar and State of Texas, have invented a new and useful Crude-Oil Burner, of which the following is a specification.

This invention relates to crude oil burners, and the object of the invention is to provide a burner of simple and inexpensive construction which will be efficient in operation and which may be placed within the firebox of any ordinary stove or range.

The object of the invention is attained in the use of the device illustrated in the accompanying drawings, and the invention consists in certain novel features of the same, as will be hereinafter described and claimed.

In the drawings, Figure 1 is a transverse section of my improved burner showing the same in position within a cook stove which is indicated in dotted lines. Fig. 2 is a perspective view of the trough. Fig. 3 is a perspective view of the burner pan.

In carrying out my invention, I employ a burner pan 1 which may be of any desired dimensions and is preferably constructed of sheet metal. This pan has a flat bottom 2 adapted to rest upon the grate bars of a stove or range whereby the pan will be supported within the firebox, and is also provided with upstanding side and end walls 3 to prevent the oil which may pass into the pan from spreading over the grate bars and thereby being wasted or producing an excessive flame. A trough 4 is also employed and the said trough consists of a body 5 having a shallow recess 6 in its upper side and having feet 7 on its under side, as shown, the said trough being of such size as to fit within the burner pan and leave a space between the sides of the pan and the trough as well as between the ends of the pan and the trough. The shallow recess 6 in the top of the trough extends throughout the length of the same, and from one side of the trough at about the center of the same projects a nipple or feed pipe 8, the bore of which communicates through an opening 9 in the upper side of the nipple with the trough 6, as clearly shown in Fig. 2. This nipple 8 is intended to project through the door of the stove or any other suitable opening, and in the outer end of the same I insert the end of an oil supply pipe 10 equipped with a valve 11 in order that the flow of fuel may be regulated. The supply pipe 10 is of less diameter than the nipple 8 so that an air space 12 will be left between the fuel pipe and the nipple in order to supply the necessary air to the fuel to produce the desired vaporization and combustion.

In the operation of the device, a supply of fuel is permitted to flow through the nipple 8 and into the recess 6, and this supply is ignited. The trough will thus be heated and any additional oil flowing into the same will be rapidly vaporized and ignited so as to produce an intense flame with a minimum consumption of fuel and consequently effect an economy in the cost of heating and cooking. Any fuel which may overflow from the trough will be caught by the burner pan and will be consumed by the flame of the fuel in the trough and as the trough is constantly getting hotter, the less volatile particles will be gradually consumed in the trough so that the liability of an overflow from the burner pan is overcome.

The device is extremely simple in its construction and its arrangement, and as the trough simply rests loosely in the burner pan, the cleaning or repairing of the parts is a very simple matter. The air necessary for combustion and vaporization is supplied through the nipple 8 with the oil so that the presence of drafts which would tend to extinguish the flame or make the maintenance of the same uncertain will be prevented.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention, what I claim as new, and desire to secure by Letters Patent, is:—

A crude oil burner comprising a burner pan, a trough provided with depending supports adapted to rest on the bottom of the pan and thereby hold the trough in spaced relation to the pan, the said trough having a longitudinal shallow recess in its top, a feed pipe extending from one side of the trough and provided in its upper side near its lower end with an opening forming a communication between its bore and the recess in the top of the trough, the said trough, supports and feed pipe being formed of one piece, and a fuel pipe entering the outer end of the said pipe and of less diameter than the same, whereby an air space is provided between the two pipes.

In testimony, that I claim the foregoing as my own, I have hereto affixed my signature in the presence of two witnesses.

CHARLES SHAEFFER.

Witnesses:
T. N. WHITE,
D. C. ROLLINS.